United States Patent [19]

Beck et al.

[11] Patent Number: 4,516,494

[45] Date of Patent: May 14, 1985

[54] ANTI THEFT DEVICE FOR A PRINTING MACHINE PRINT WHEEL ASSEMBLY

[75] Inventors: Christian A. Beck, Ridgefield; Alton B. Eckert, Norwalk, both of Conn.

[73] Assignee: Pitney Bowes Inc., Stamford, Conn.

[21] Appl. No.: 591,891

[22] Filed: Mar. 21, 1984

Related U.S. Application Data

[63] Continuation of Ser. No. 459,427, Jan. 20, 1983, abandoned.

[51] Int. Cl.³ ................................................ B41J 1/54
[52] U.S. Cl. ..................................... 101/93.26; 101/91
[58] Field of Search ..................... 101/45, 71, 91, 92, 101/93.18, 93.21, 93.41, 109, 110, 371, 93, 93.02, 93.26; 74/422; 235/101, 95 R; 70/316; 116/200

[56] References Cited

U.S. PATENT DOCUMENTS

| | | | |
|---|---|---|---|
| 1,965,724 | 7/1934 | Sanglier et al. | 101/91 |
| 3,064,491 | 11/1962 | Bishop | 74/498 X |
| 3,428,948 | 2/1969 | Simjian | 101/91 X |
| 3,469,777 | 9/1969 | Anderson et al. | 235/101 |
| 3,502,266 | 3/1970 | Clemons | 235/101 |
| 3,823,666 | 7/1974 | Hanson | 101/45 X |
| 4,036,073 | 7/1977 | Kitano | 74/422 X |

Primary Examiner—Edgar S. Burr
Assistant Examiner—John A. Weresh
Attorney, Agent, or Firm—Martin D. Wittstein; William D. Soltow, Jr.; Albert W. Scribner

[57] ABSTRACT

A printing machine such as a postage meter has the capability of printing value indicia on material by means of a printing device having a plurality of selectably positioned printing wheels with a plurality of spaced apart numerical printing members arranged about the periphery of each wheel. The printing wheels are mounted for rotation on a common axis and each wheel has a concentrically located gear mounted on one side. The number of gear teeth in each printing wheel gear corresponds to the number of printing members and tooth spaces located in drivem members which mesh with the printing wheel gears in a predetermined synchronous relationship associated with the drive members. The printing wheel gears further have non-disfigured gear teeth as well as at least one disfigured gear tooth which meshes with correspondingly shaped spaces on each drive member so that any forced change in the synchronous relationship will render the postage meter inoperative.

6 Claims, 5 Drawing Figures

ANTI THEFT DEVICE FOR A PRINTING MACHINE PRINT WHEEL ASSEMBLY

This application is a continuation of application Ser. No. 459,427, filed 01/20/83, now abandoned.

FIELD OF THE INVENTION

The present invention relates generally to the field of printing and more particularly to an anti theft device for a printing assembly within a printing machine. The invention is described within a postage meter and is intended to prevent operation of the postage meter in the event that the printing assembly has been tampered with by an operator. Although the present invention is intended to be used in a postage meter, it may be used in other printing machines having the capability of printing value indicia on material.

Generally speaking, postage meters and mailing machines are very well known in the art, and most everyone is familiar with the typical postage meter imprint located in the upper right hand corner of an envelope which has been mailed. The postage meter imprint typically contains fixed indicia in the form of a design and also variable indicia in the form of an amount of postage as well as a date. As can readily be appreciated, when a postage imprint is placed on an envelope, or for that matter on a label which is attached to a package, the postage meter is dispensing money represented by the value of the postage printed on the envelope or label. This amount of money is accounted for in the postage meter by a pair of registers, a so called ascending register which adds up the amount of postage being dispensed and a descending register which is initally set for the amount of postage set into the meter and which descends each time an amount of postage is dispensed by the meter. By this accounting system, the postal service can keep track of the amount of postage dispensed by the meter and thereby insure that the meter customer cannot obtain more postage than that for which he has paid. This accounting system also insures that the customer will receive the amount of postage for which he has paid.

As will become apparent hereinafter, if there is any way in which a user of the postage meter can alter the mechanical arrangement of the postage printing wheels or otherwise tamper with the meter in order to cause it to dispense an unauthorized amount of postage, in effect the meter user is stealing money from the Postal Service. For this reason, meter security has always been and continues to be an extremely important aspect in the design and manufacture of a postage meter. In the past, considerable time and effort have been expended in devising various forms of security measures to prevent any form of tampering or unauthorized operation of a postage meter to cause it to dispense postage during a printing operation, and to insure that each and every printing operation which dispenses postage is properly accounted for in the ascending and descending register mechanisms. It should be noted, incidentally that the descending register causes the meter to lock up and not operate after the meter has dispensed the amount of postage previously paid for by the customer and put into the meter. Experience has shown that there are a variety of ways that have been devised to alter or tamper with postage meter mechanisms in order to cause them to operate in an unauthorized manner, and the variety of these problems and the solutions devised from time to time to these solutions are far too numerous to set forth in this specification.

In one particular form of postage meter, the meter has a forwardly opening slot into which an envelope is manually inserted, and when properly inserted actuates a trip mechanism which causes a platen on which the envelope is resting to rise from a home position to bring the envelope into forcible contact with a printing die located within the postage meter housing which causes the indicia of the die, both the fixed and variable indicia, to be printed on the envelope. After the printing takes place, the platen lowers to its original position and the envelope is ejected. It is possible for an operator to extend his fingers into the envelope receiving slot far enough to physically touch the postage printing wheels. Ordinarily, the printing wheels, which are settable, are actuated by driven rack members which engage gear teeth on the print wheels. The rack members are normally held in a fixed position once they have been moved to that position by the mechanical connections to the rack members from the drive motor, and since the rack members are immovable once they have been set, they in turn ordinarily maintain the gears on the print wheels in a fixed position, thereby locking the print wheels in the fixed position. There is a predetermined relationship between the gear teeth on the gears and the tooth spaces on the driven rack members which is maintained throughout operation of the postage meter, and so long as this predetermined relationship is not altered, each time an amount of postage is selected by operation of the postage selecting mechanism, the print wheels will be driven to the desired position and the postage dispensed will be properly recorded in the ascending-/descending registers. A problem arises if an operator inserts his fingers into the envelope receiving slot or attempts to manipulate an appropriately shaped tool, to alter the predetermined relationship between the teeth on the print wheel gears and the tooth spaces on the driven rack members so as to change the aforementioned predetermined relationship therebetween. The result is that when the operator now selects a certain amount of postage by operation of the normal keyboard mechanism, the postage meter will in fact print an amount of postage different from that selected. It requires only movement of the print wheels in an appropriate direction to cause the postage meter to print an amount of postage which is higher than that selected. However, the amount of postage selected rather than that printed will be the amount that will be entered into the ascending and descending registers with the result that the postage meter will dispense considerably more postage than that which has been paid for by the customer and is properly entered into the postage meter registers. It is clear that this type of alteration or tampering with the position of the postage printing wheels can, over an extended period of time, result in the loss of a large amount of money by the Postal Service through printing of unauthorized and excess amounts of postage by the postage meter, thereby presenting a very serious problem. While such tampering is discouraged by postal laws and regulations, the present invention provides a ready solution to prevent further operation of a compromised postage meter or other printing machine to preclude losses of postage or other unauthorized misuse of printed, value indicia.

SUMMARY OF THE INVENTION

The present invention provides a solution to the problem described above by mechanically disabling the operation of the postage meter on any cycle of operation following an alteration in the predetermined relationship between the gear teeth on the print wheels and the corresponding tooth spaces on the driven rack members.

In its broader form, the present invention resides in a postage meter having the capability of printing postage indicia on envelopes or tape by means of a printing device having a plurality of selectively settable printing wheels mounted for rotation on a common axis and having a plurality of numerical printing members arranged around the periphery of the printing wheels. The printing device includes a means for setting the printing wheels which device comprises a gear carried by each of the printing wheels on one side thereof and having a predetermined number of gear teeth, a device also including a movable drive member operatively associated with each printing wheel, with each drive member having a plurality of teeth thereon defining at least a corresponding plurality of tooth spaces adapted to engage and mesh with the gear teeth in a predetermined synchronous relationship. In the foregoing assembly, the present invention comprises the improvement of a means responsive to a change in the predetermined synchronous relationship between the gear teeth of any of the gears and the tooth spaces of the corresponding drive members associated with the gears for preventing the gear teeth from meshing with the tooth spaces which in turn will prevent the postage meter from operating. More specifically, the aforesaid means includes at least one of the gear teeth on each of the gears being disfigured so as to have a shape different from the shape of the other gear teeth and at least one of the tooth spaces on each of the drive members being disfigured so as to have a shape corresponding to the shape of the disfigured gear teeth, the shape of both the disfigured gear tooth and the correspondingly disfigured tooth space being such that the disfigured gear tooth will mesh only with the disfigured tooth space and not with any other tooth space.

It will be apparent that a very effective security arrangement is provided by the present invention to prevent operation of the postage meter if, for any reason or by whatever means, the predetermined relationship between the gear teeth on the printing wheels and the tooth spaces on the rack members is altered from that which is set during manufacture of the postage meter since, if the postage meter cannot operate under the altered synchronous relationship, it becomes impossible for the meter user to obtain unauthorized postage.

Having briefly described the general nature of the present invention it becomes a principal object thereof to provide an anti-theft device for a postage meter print wheel assembly which effectively prevents operation of the postage meter in the event that the print wheel assembly has been tampered with.

It is another object of the present invention to provide an anti-theft device for a postage meter print wheel assembly which is constructed and arranged to prevent operation of the postage meter by disabling the print wheel assembly from further operation in the event that a predetermined relationship between the print wheels and a drive member therefor has been altered either accidentally or by intentional tampering with the postage meter. It is another object of the present invention to provide a means of detecting whether the predetermined relationship of print wheels and their drive members has been tampered with.

It is a further object of the present invention to provide a means of ensuring that the initial assembly of the print wheels and their respective drive members is correct with respect to a predetermined relationship.

These and other objects and advantages of the present invention will become more apparent from an understanding of the following detailed description of the preferred embodiments of the invention when considered in conjunction with the accompanying drawings in which.

Figure 1:
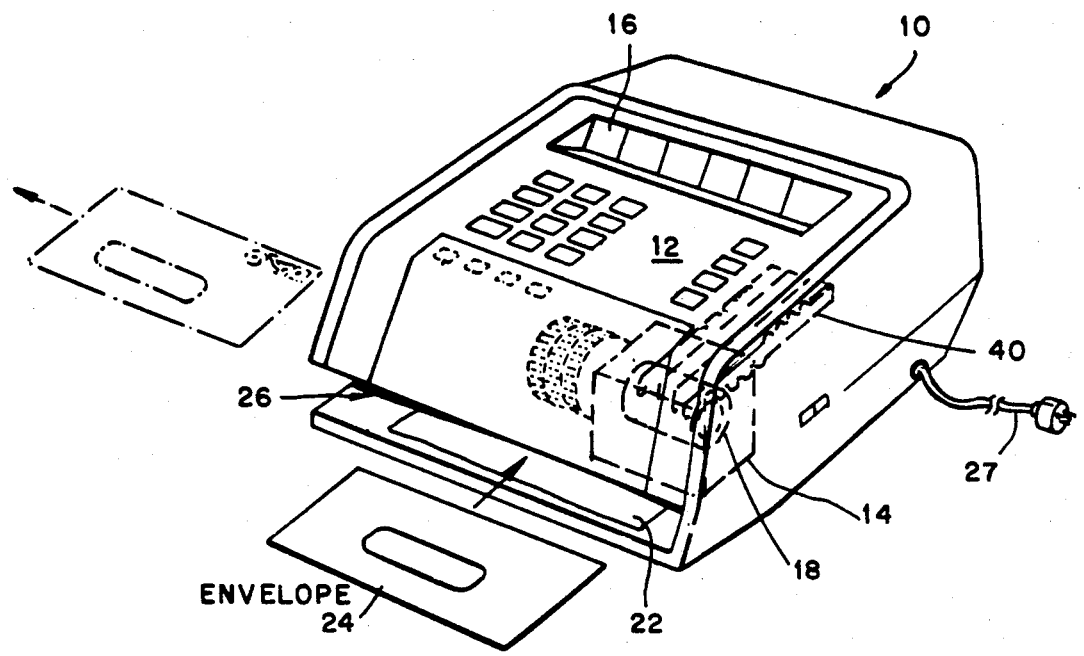
FIG. 1 represents an isometric view of a postage meter for producing postage indicia upon an envelope.

Referring to FIG. 1, there is seen a printing machine in the form of a postage meter 10 for printing postage indicia upon mail. The meter 10 has an operator input keyboard 12 for selecting postage values. The meter 10 illustrated is preferably a meter such as that shown and described in detail in a copending patent application entitled "Stand Alone Electronic Postage Meter", Ser. No. 447,815 to inventors D. Buan and A. Eckert.

The Buan-Eckert disclosure has a detailed description of the construction and operation of the meter parts pertinent to cause operation of the printing wheel assembly 14.

Figure 2:
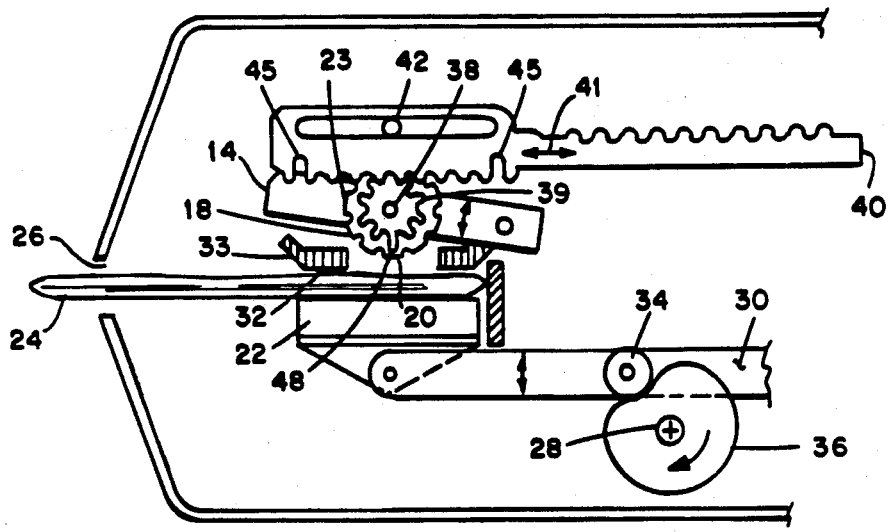
FIG. 2 represents a partial sectional view of the side of the meter of FIG. 1, illustrating a portion of the printing device.
Figure 3:
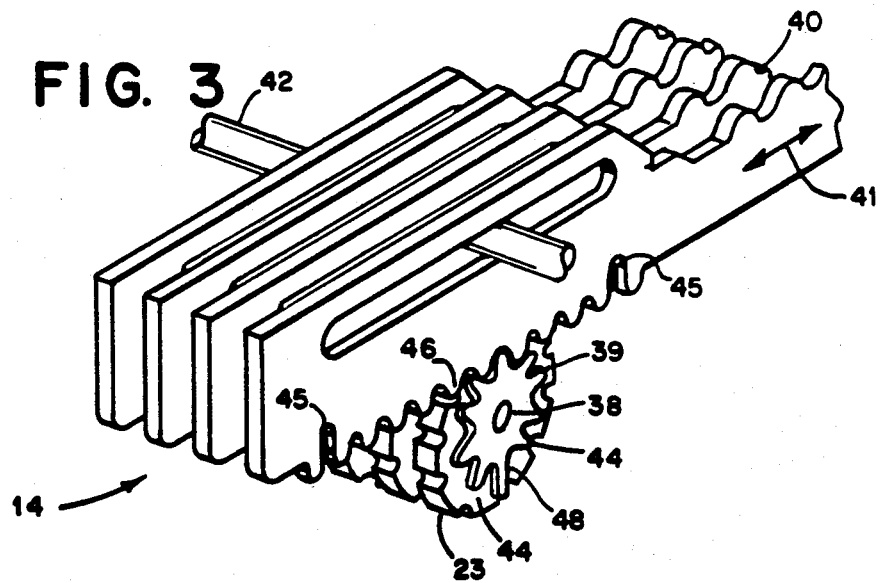
FIG. 3 is an enlarged isometric view of the printing wheel assembly, and portions of the relating drive members associated disfigured gear tooth and tooth spaces.

The machine operator selects the desired postage value by using the keyboard 12 and may subsequently view the selected value at the meter display window 16. The corresponding value set into the plurality of printing wheels 18 remains in an aligned printing position 20 (FIG. 2) for each print cycle of the meter 10. This printing position 20, is essentially horizontal; and parallel to a cam operated print platen 22 which is caused to press the subject mail article 24 placed within the meter throat 26 against spaced apart numerical printing members 23 located on each of the set printing wheels 18. There is a one revolution cam shaft 28, and a cooperating pair of pivoting platen arms 30 mounted on the frames and structure (not shown) of the meter 10. The platen arms 30 each have a cam follower 34 which rides on the cams 36 as the cams 36 unitarily rotate with the one revolution cam shaft 28 during the print function of the meter 10 cycle. While the cams 36 lift the platen arms 30, the platen arms 30 lift the attached print platen 22, and the mail article 24 is pressed against the printing wheels 18 as previously described. In FIG. 2, the printing wheel assembly 14 is shown raised, above the lower surface 32 of the protective die shelf 33. As described in more detail in the aforementioned application, the printing wheel assembly 14 is lowered two separate times by a cam operated device (not shown), so that the numerical printing members 23 may engage an inking device (not shown), and later, the mail article 24.

The printing wheels 18 are mounted for rotation on a common axis comprising a shaft 38, which is appropriately mounted to unshown frame members of the printing assembly 14. The printing wheels 18 are separated by appropriate lateral spacer members (not shown), and each of the printing wheels 18 has, on one side, concentrically arranged gear teeth 39 and as previously mentioned a plurality of spaced apart numerical printing members 23 arranged about the periphery of the printing wheels 18. The number of numerical printing members 23 corresponds to the number of the gear teeth 39 on each of the printing wheels 18, which in the present invention is number ten. These spacer members provide sufficient lateral clearance for separate rotation of the printing wheels 18 under influence of the individual associated meshing drive members 40 which engage each set of gear teeth 39 on the printing wheels 18. The drive members 40 are supported and guided for reciprocal motion indicated by the arrows 41 with respect to the printing wheels 18 by a shaft 42 which is mounted in a similar fashion as the previously described shaft 38. The drive members 40 are also supported and guided by other means (not shown) in the present disclosure, but described in the aforementioned application.

An input mechanism (also not shown) enables the drive members 40, thereby imparting reciprocable motion (arrows 41), two separate instances during a cycle of the meter 10 comprising initialization and setting of the printing wheels 18. The initialization phase of the meter 10 cycle is accomplished automatically each time the meter 10 is powered up. During the initialization process the drive members 40 are caused to move reciprocably in the directions indicated by the arrows 41 comprising a full stroke forward and reverse. This motion of the drive members 40 in turn thereby imparts nearly a full 360 clockwise and counter clockwise rotation to each of the printing wheels 18 representing the entire capability of zero to nine numerical printing members 23 as provided on each of the printing wheels 18. The initializing motion of the drive members 40 is carried out each time the postage meter 10 is powered up with line voltage. The postage meter 10 is typically powered with 115 VAC power, which drives an AC motor, along with electrical power supplies, which provide various DC power to other drive sources, (not shown) in the drawings, but understood by those skilled in the art in respect to their respective functions. The initialization function assures that there is no problem with the drive members 40 in moving to a position commensurate with the input value selection desired by the operator through the keyboard 12. When this initialization function has been completed, the intended selected value is then correspondingly set up by rotating and registering the printing wheels 18 in preparation for completion of the meter 10 cycle actuated by insertion of a mail article 24, which enables a trip switch (not shown) in the meter throat 26 of the meter 10.

If, there is a problem recognized by the meter 10 due to the malfunction of the initialization and setting procedure of the printing wheels 18, a signal (not shown) is immediately displayed at the meter display window 16. For example, a malfunction would constitute a failure of the printing wheels 18 to set to their intended printing position as a result of a jam at the drive members 40.

DESCRIPTION OF THE PREFERRED EMBODIMENT

There has heretofore been a problem with the printing wheels assembly 14 as has been briefly defined in the preceding text under "Field of the Invention". Specifically, tampering with the set printing wheels 18, within the printing wheel assembly 14 such as that in a postage meter 10 after pulling the power cord 27 during a print cycle will present such a problem. For example, if an operator pulls the power cord 27 from the power source at the right time of a printing cycle of the meter 10, it is possible to gain unauthorized access to the printing wheels 18 through the open meter throat 26. There are two separate instances as previously mentioned during a meter 10 printing cycle when it is possible to tamper with the printing wheels 18, namely just after inking of the printing wheels 18 and just prior to the automatic raising of the print platen 22. The printing wheels 18 are caused to move downwards these two instances towards the print platen 22, while still in engagement with the drive members 40. In either case, the meter throat 26 is open and it is relatively easy to reach into the meter throat 26 and the printing wheel assembly 14 with a spring hook or other similar implement, in order to push or pull one or more printing wheels 18 to an alternate position in order to gain an unauthorized, printed value. A higher value may thusly be aligned to print when one or more of the printing wheels 18 are forcibly moved from their respective automatic registered position.

However, when forcing the set position of the printing wheels 18, it is necessary to cause the engaged gear teeth 39 to jump their originally assembled, synchronized and predetermined position which constitutes a normal match and mesh in respect to the gear teeth 39 and the corresponding tooth spaces 46 on the respective drive members 40. The respective components such as the gear teeth 39 and cooperating drive members 40 are manufactured with a plastic material such as Deltrin TM and, it may be possible to illegally deflect or force the plastic gear teeth 39 to another position in mesh with other tooth spaces 46. Even if the associated parts are made from a metal material, given enough force it may be possible to jump or deflect the meshed gear teeth 39 past the resepctive tooth spaces on the drive members 40.

At any time that the predetermined timed relationship between the printing wheels 18, and the drive members 40 is altered by jumping the meshed gear teeth 39 past the tooth spaces 46, the original intended, manufactured and assembled relationship necessary to perform the intended print function of a selected postage value will be incorrect and an appropriate malfunction signal will be displayed to the operator when a print cycle is initiated on the meter 10.

In addition, with the present invention, there will also be physical evidence of a multilation of the gear tooth spaces 46 within the illegally set drive members 40. And, there will also be evidence of tampering on the associated disfigured gear teeth 48. The disfigured gear teeth 48 being sized or shaped differently than the other non-disfigured gear teeth 44, within the gear teeth 39 of each of the printing wheels 18, will not properly mesh with any other non-disfigured gear tooth spaces as such represented by gear tooth spaces 46 on the drive member 40, consequently mutilating any other position with respect to the non-disfigured gear tooth spaces 46.

There is normally at least two spaced apart disfigured gear tooth spaces 45 on each of the drive members 40. These disfigured gear tooth spaces 45 are designed to normally mesh with the disfigured gear teeth 48, and are each spaced apart on the drive members 40 by a plurality of gear tooth spaces 46 equal to the meshing non-disfigured gear teeth 44 within the gear teeth 39 of each printing wheel 18, which in the present disclosure is number nine.

Those skilled in the art will note at this point that it is possible to provide an alternating pattern of disfigured gear teeth 48 within the gear teeth 39 which will properly mesh to a similarly arranged pattern of disfigured gear tooth spaces 45 within the drive members 40. However, if the gear teeth 39 are forcibly jumped past a number of gear tooth space pitches equal to the corresponding gear tooth pitches, there will not be a mismatch of the dissimilar gear tooth shapes and gear tooth spaces which would otherwise render the postage meter 10 inoperative or cause visible tampering evidence as desired to detect such tampering.

Figure 4:
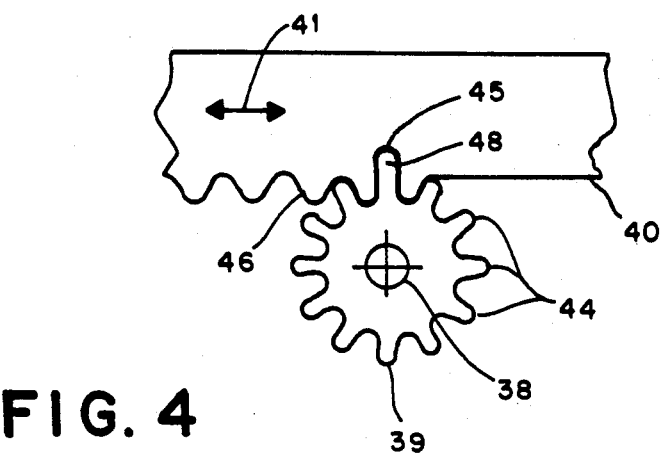
FIG. 4 represents a partial enlarged side view taken from FIG. 3 of a disfigured gear tooth in mesh with a disfigured tooth space.

FIG. 4 illustrates a partial view of the gear teeth 39 and particularly the disfigured gear teeth 48 in mesh with corresponding disfigured gear tooth spaces 45.

Figure 5:
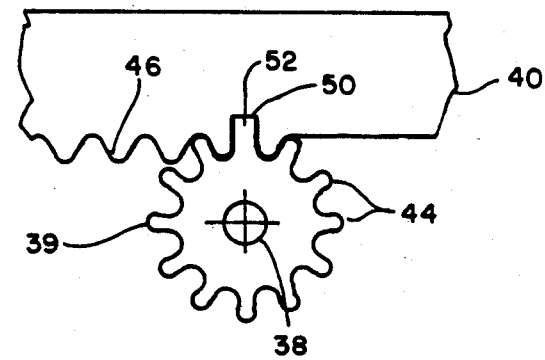
FIG. 5 represents an enlarged view, similar to FIG. 4 of an alternate embodiment of a disfigured tooth in mesh with a disfigured tooth space.

In FIG. 5, an alternate embodiment of a disfigured tooth space 50 is illustrated. The corresponding alternate disfigured tooth profile 52 is substantially dissimilar in shape with respect to the shape of the other non-disfigured tooth spaces 46 on drive members 40. It will be noted by those skilled in the art, that a conventional spur gear shape is utilized as such in the drawings of the present disclosure. Of course, there are other gear tooth shapes that may be used as non-disfigured gears and correspondingly different disfigured gear tooth shapes as well. In addition, it will be noted that there is an intentional, substantial difference in the respective sizes as well as the shape as demonstrated by the present alternate embodiment of the disfigured gear tooth space 45 in comparison to the other non-disfigured gear tooth spaces 46. Any difference in the design or shape of the disfigured gear teeth with respect to the non-disfigured gear teeth and cooperating spaces as such may be alternately represented by conventional means such as diametrial pitches, known well in the art.

It will also be appreciated by those skilled in the art that the present invention constitutes a means of checking on the manufacturing assembly line of the predetermined synchronized relationship of the printing wheels 18 with respect to the drive members 40. For example, a quality control test at the correct time would detect a mistiming of the printing wheels 18, with respect to the drive members 40.

It is known and understood for the purpose of the present application that the term postage meter refers to the general class of device for the imprinting of a defined value for governmental or private carrier delivery of parcels, envelopes or other like application for unit value printing. Thus, although the term postage meter is utilized, it is both known and employed in the trade as a general term for devices utilized in conjunction with services other than those exclusive employed by governmental postage and tax services. For example, private, parcel and freight services purchase and employ such meters as a means to provide unit value printing and accounting for individual parcels.

It is recognized that it is possible to change the structure, shape and combination of the parts involved in the present invention to achieve the end result. Therefore, with this in mind and having described a preferred embodiment of the present invention in addition to an alternate embodiment, the following claims are intended to capture the spirit and scope of the invention at hand.

What is claimed is:

1. In a printing machine having the capability of printing value indicia on material by means of a printing device having a plurality of selectively settable printing wheels mounted for rotation on a common axis and having a plurality of numerical printing members arranged around the periphery thereof, said printing device including means for setting said printing wheels, said setting means comprising a gear carried by each of said printing wheels on one side thereof and having a predetermined number of gear teeth, and a movable drive member operatively associated with each printing wheel, each drive member having a plurality of teeth thereon defining at least a corresponding plurality of tooth spaces adapted to engage and mesh with said gear teeth in a predetermined synchronous relationship, the improvement comprising:
    means to render said machine inoperative responsive to alterations of said predetermined synchronous relationship including
    means responsive to an alteration in said predetermined synchronous relationship between the teeth of any of said gears and the tooth spaces of the corresponding drive members associated with said gears for preventing said gear teeth from meshing with said tooth spaces in at least a portion of said corresponding plurality of tooth spaces for prohibiting cycling of said drive members.

2. The improvement as set forth in claim 1 wherein said means comprises:
    A. at least one of said gear teeth on each of said gears being disfigured so as to be different from others of said gear teeth, and
    B. at least one of said tooth spaces on each of said drive members being disfigured in correspondence to said disfigured gear tooth,
    C. said disfigured gear tooth and said correspondingly disfigured tooth space being such that said disfigured gear tooth will mesh only with said disfigured tooth space and not with any other tooth space.

3. The improvement as set forth in claim 2 wherein each of said drive members has at least two spaced apart tooth spaces which correspond to said disfigured gear tooth and said two tooth spaces of each drive member are separated by at least the same number of tooth spaces as there are non-disfigured gear teeth on each corresponding gear.

4. The improvement as set forth in claim 2 wherein the at least one disfigured gear tooth is of different size than the others of said gear teeth.

5. The improvement as set forth in claim 2 further comprising a meter display indication for indicating a malfunction constituting failure of said print wheels to set an intended printing position.

6. In a printing machine having the capability of printing value indicia on material by means of a printing device having a plurality of selectively settable printing wheels mounted for rotation on a common axis and having a plurality of numerical printing members arranged around the periphery thereof, said printing device including means for setting said printing wheels, said setting means comprising a gear carried by each of said printing wheels on one side thereof and having a predetermined number of gear teeth, and a movable drive member operatively associated with each printing wheel, each drive member having a plurality of teeth thereon defining at least a corresponding plurality of tooth spaces adapted to engage and mesh with said gear teeth in a predetermined synchronous relationship, the improvement comprising:

means to render said machine inoperative responsive to alterations of said predetermined synchronous relationship including means for preventing said gear teeth from meshing with said tooth spaces upon an alteration in said predetermined synchronous relationship between the teeth of any of said gears and the tooth spaces of the corresponding drive members associated with said gears and means responsive to said prevention of meshing for indicating a malfunction in said printing machine.

* * * * *